US010048967B2

(12) United States Patent
Jackson (10) Patent No.: US 10,048,967 B2
(45) Date of Patent: Aug. 14, 2018

(54) PROCESSOR ARRANGED TO OPERATE AS A SINGLE-THREADED (NX)-BIT PROCESSOR AND AS AN N-THREADED X-BIT PROCESSOR IN DIFFERENT MODES OF OPERATION

(71) Applicant: Imagination Technologies Limited, Kings Langley (GB)

(72) Inventor: Hugh Jackson, Sydney (AU)

(73) Assignee: MIPS Tech, LLC, Santa Clara, CA (US)

( * ) Notice: Subject to any disclaimer, the term of this patent is extended or adjusted under 35 U.S.C. 154(b) by 246 days.

(21) Appl. No.: 14/798,841

(22) Filed: Jul. 14, 2015

(65) Prior Publication Data

US 2016/0011869 A1    Jan. 14, 2016

(30) Foreign Application Priority Data

Jul. 14, 2014    (GB) .................................. 1412478.8

(51) Int. Cl.
*G06F 9/30* (2018.01)
*G06F 9/38* (2018.01)
*G06F 9/455* (2018.01)

(52) U.S. Cl.
CPC ........ *G06F 9/30189* (2013.01); *G06F 9/3001* (2013.01); *G06F 9/3009* (2013.01); *G06F 9/30112* (2013.01); *G06F 9/30123* (2013.01); *G06F 9/3814* (2013.01); *G06F 9/3851* (2013.01); *G06F 9/45533* (2013.01)

(58) Field of Classification Search
CPC ............ G06F 9/30189; G06F 9/30123; G06F 9/30112; G06F 9/30105; G06F 9/00–9/3897
See application file for complete search history.

(56) References Cited

U.S. PATENT DOCUMENTS

| 6,343,356 B1 * | 1/2002 | Pechanek ............ G06F 9/30036 711/173 |
| 6,862,563 B1 * | 3/2005 | Hakewill ............ G06F 9/30145 703/13 |
| 6,954,846 B2 * | 10/2005 | Leibholz ............... G06F 9/3012 711/163 |
| 6,973,562 B1 | 12/2005 | McGrath et al. |

(Continued)

FOREIGN PATENT DOCUMENTS

EP    1247171 A1    10/2002

*Primary Examiner* — Keith E Vicary
(74) *Attorney, Agent, or Firm* — Vorys, Sater, Seymour and Pease LLP; Vincent M DeLuca (57) ABSTRACT

Methods of running a 32-bit operating system on a 64-bit processor are described. In an embodiment, the processor comprises 64-bit hardware and when running a 64-bit operating system operates as a single-threaded processor. However, when running a 32-bit operating system (which may be a guest operating system running on a virtual machine), the processor operates as a two-threaded core. The register file is logically divided into two portions, one for each thread, and logic within a functional unit may be split between threads, shared between threads or duplicated to provide an instance of the logic for each thread. Configuration bits may be set to indicate whether the processor should operate as a single-threaded or multi-threaded device.

18 Claims, 5 Drawing Sheets

(56) References Cited

U.S. PATENT DOCUMENTS

| | | | | |
|---|---|---|---|---|
| 7,051,329 | B1 * | 5/2006 | Boggs | G06F 9/30123 |
| | | | | 712/E9.027 |
| 7,840,783 | B1 | 11/2010 | Singh et al. | |
| 2004/0216101 | A1 * | 10/2004 | Burky | G06F 9/485 |
| | | | | 718/100 |
| 2004/0221122 | A1 * | 11/2004 | Chen | G06F 12/0806 |
| | | | | 711/202 |
| 2004/0230972 | A1 * | 11/2004 | Donovan | G06F 9/45533 |
| | | | | 718/1 |
| 2006/0265576 | A1 * | 11/2006 | Davis | G06F 9/3017 |
| | | | | 712/229 |
| 2007/0198814 | A1 * | 8/2007 | Abernathy | G06F 9/30123 |
| | | | | 712/220 |
| 2007/0266387 | A1 * | 11/2007 | Henmi | G06F 9/4843 |
| | | | | 718/102 |
| 2008/0104375 | A1 * | 5/2008 | Hansen | G06F 9/30018 |
| | | | | 712/220 |
| 2011/0320765 | A1 * | 12/2011 | Karkhanis | G06F 9/30109 |
| | | | | 712/7 |

* cited by examiner

PROCESSOR ARRANGED TO OPERATE AS A SINGLE-THREADED (NX)-BIT PROCESSOR AND AS AN N-THREADED X-BIT PROCESSOR IN DIFFERENT MODES OF OPERATION

BACKGROUND

When referring to a processor as 64-bit or 32-bit, this typically refers to the width of the registers (i.e. the width of software visible registers) and when referring to an operating system as 64-bit or 32-bit this refers to the width of the virtual memory addresses. A processor with 64-bit memory addresses can therefore directly access $2^{64}$ bytes of byte-addressable memory. Most new processors are 64-bits and such processors perform most efficiently when running 64-bit software. 64-bit processors are backwards compatible, however, and most can run most 32-bit software, but this is inefficient as the 32-bit software does not use all the hardware in the 64-bit processor.

The embodiments described below are not limited to implementations which solve any or all of the disadvantages of known processor architectures.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods of efficiently running a 32-bit operating system on a 64-bit processor are described. In an embodiment, the processor comprises 64-bit hardware and when running a 64-bit operating system operates as a single-threaded processor. However, when running a 32-bit operating system (which may be a guest operating system running on a virtual machine), the processor operates as a two-threaded core. The register file is logically divided into two portions, one for each thread, and logic within a functional or execution unit may be split between threads, shared between threads or duplicated to provide an instance of the logic for each thread. Configuration bits may be set to indicate whether the processor should operate as a single-threaded or multi-threaded device.

A first aspect provides processor having a first and a second mode of operation, the processor comprising: one or more configuration registers arranged to store a configuration parameter, the configuration parameter indicating a width of software visible registers; a register file comprising a plurality of general purpose registers; control logic associated with the register file and arranged, in the second mode of operation, to logically divide the register file into a plurality of portions and to control access to the portions, each portion being arranged to store data for one of a plurality of threads of the software; and one or more functional units arranged to execute instructions from the single thread in the first mode of operation and to execute instructions from the plurality of threads in the second mode of operation, wherein the fetch stage, control logic and functional units are each arranged to switch between the first and second modes of operation dependent upon a value of the configuration parameter.

A second aspect provides a method of operating a processor comprising: setting one or more configuration registers to indicate a width of software visible registers; and switching between a first and a second mode of operation based on the configuration registers, wherein in the first mode the processor operates as a single-threaded processor and in the second mode the processor operates as a multi-threaded processor.

Further aspects provide a computer readable storage medium having encoded thereon computer readable program code for generating a processor as described herein and a computer readable storage medium having encoded thereon computer readable program code for generating a processor configured to perform the method described herein.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, although 32-bit software, such as a 32-bit operating system (OS), can run on 64-bit hardware, the 32-bit software does not take advantage of the additional hardware in the 64-bit processor. A processor architecture and method of operation of a processor is described herein which enables the 64-bit hardware to appear as a two-threaded 32-bit core to 32-bit software running on the hardware and to appear as a single-threaded 64-bit core to 64-bit software. The 32-bit software may, for example, be a guest OS which is running on a 64-bit hypervisor (or virtual machine monitor) or alternatively, a processor may be designed to be booted into either a 64-bit mode or a 32-bit mode. By running the 32-bit software on 64-bit hardware which operates as a two-threaded 32-bit processor (as described herein), the performance of the software is improved compared to running the 32-bit software on a standard 64-bit processor. Furthermore, where virtualization is used (e.g. where the 32-bit software is a guest OS running on a 64-bit hypervisor), the hardware may switch between the two modes of operation (single-threaded 64-bit and two-threaded 32-bit) in a manner which is transparent to the guest OS and this may be done dynamically depending on what is being run on the hardware (e.g. whether the guest OS is 32-bit or 64-bit). The operation of the hardware described herein is unchanged for the 64-bit software but operates differently for 32-bit software.

There are many reasons why a user may wish to run 32-bit software on 64-bit hardware. Not all operations require the additional capabilities of 64-bit software and there is a huge amount of legacy 32-bit software in existence. In various examples, a user may use virtualization to host a guest OS on top of a root OS, where the root OS is 64-bit software and the guest OS may be 32-bit or 64-bit software. In various examples, unless the guest OS is performing large multiplications, 64 bits may not be required and so a user may use only a 32-bit guest OS or may switch between a 64-bit guest OS and a 32-bit guest OS. In some examples, a user may run two or more guest operating systems on top of a root OS (e.g. a work OS and a home OS), one or both of which may be a 32-bit OS. An improvement in performance may be achieved in this way by running with two 32-bit threads compared to a single 32-bit thread on 64-bit hardware.

In order to operate as a two-threaded core, when running 32-bit software, the general purpose registers (GPRs) within the processor (e.g. within the register file in the processor) are logically divided into two parts with each thread using one of the parts of the GPRs. For example, the first thread (thread 0) may use the lower half of each of the GPRs (e.g. the lower half of GPR[0], the lower half of GPR[1], etc.) and the second thread (thread 1) may use the upper half of each of the GPRs (e.g. the upper half of GPR[0], the upper half of GPR[1], etc.). Additionally, some arithmetic logic units (ALUs) within the processor may be designed so that a 64-bit ALU can be utilized to perform two 32-bit operations in parallel. Other ALUs may be shared between threads or duplicated to provide an instance of the logic for each thread.

Although the methods and hardware are described herein as being used to run 32-bit software on 64-bit hardware, the techniques may also be applied to running 32-bit software on 128-bit hardware (in which case the hardware acts as a four-threaded 32-bit processor), running 64-bit software on 128-bit hardware (in which case the hardware acts as a two-threaded 64-bit processor), running 32-bit software on 96-bit hardware (in which case the hardware acts as a three-threaded 32-bit processor), etc. In general the methods and hardware described herein may be used to run X-bit software (where, for example, X=32, 64, etc.) on (nX)-bit hardware (where n is a positive integer greater than 1), with the (nX)-bit hardware operating as an n-threaded X-bit processor. The resultant hardware has multiple modes of operation: a first mode in which it operates as a single-threaded (nX)-bit core and at least one additional mode in which it operates as an n-threaded X-bit processor (where each GPR is divided into n parts, with each thread using one of the parts of the GPRs).

In various examples, the hardware may have more than two modes of operation, e.g. 128-bit hardware may operate as a single-threaded 128-bit processor in a first mode, a two-threaded 64-bit processor in a second mode and a four-threaded 32-bit processor in a third mode. In general the hardware has at least two modes of operation. In one mode it operates as a single-threaded core (and this may be referred to as the 'normal mode' of operation) and in each additional mode it operates as a multi-threaded core (and an additional mode may be referred to as a 'multi-threaded mode' of operation).

Figure 1:
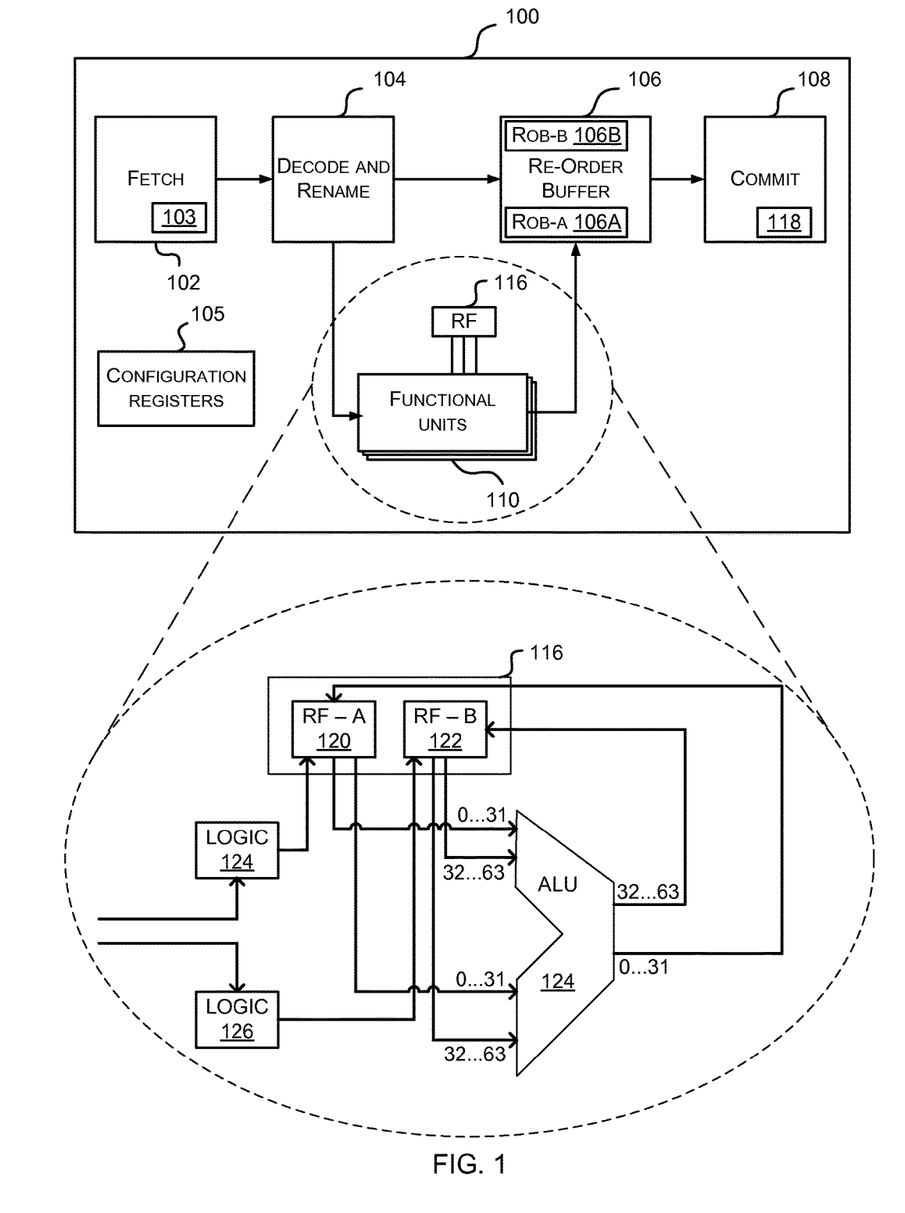
FIG. 1 shows a schematic diagram of an example out-of-order processor.
Figure 5:
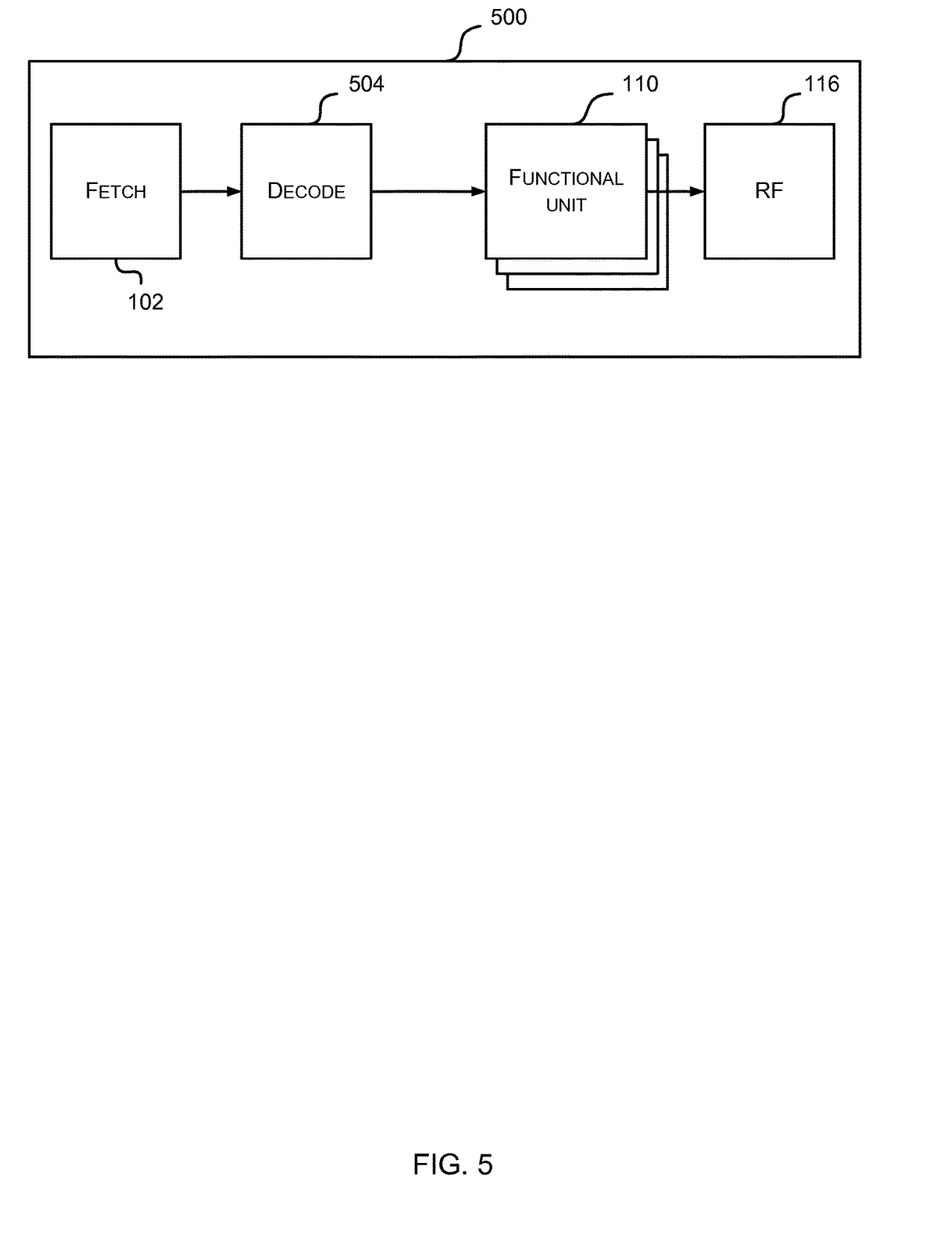
FIG. 5 is a schematic diagram of an example in-order processor.

FIG. 1 shows a schematic diagram of an example out-of-order processor 100 in which the methods described herein may be implemented. Although FIG. 1 shows an out-of-order processor, the methods may also be implemented in an in-order processor as shown in FIG. 5 (i.e. a processor which does not process instructions out-of-order). In this example the processor 100 is a single-threaded processor; however the methods may also be used in multi-threaded processors and in a multi-threaded processor, the methods may be used for all the threads (e.g. a two-threaded 64-bit core could use the methods described herein to operate in a 4-threaded 32-bit mode or for only a (proper) subset of the threads (e.g. a two-threaded 64-bit core could use the methods described herein to operate in a 2-threaded 32-bit mode, using one thread, and a single-threaded 64-bit mode, using the other thread).

The processor 100 comprises a fetch stage 102, a decode and rename stage 104, a re-order buffer 106, a commit stage 108, one or more functional units 110 which each comprise one or more execution pipelines, and a register file (RF) 116. The lower part of FIG. 1 shows an expanded view of the register file 116 and a portion of a functional unit 110.

The fetch stage 102 is configured to fetch instructions from a program (in program order) as indicated by a program counter (PC). When running 64-bit software on 64-bit hardware, the fetch stage 102 operates normally; however, when running 32-bit software on the 64-bit hardware, the fetch stage 102 fetches instructions for both threads. The fetch stage 102 may, for example, fetch instructions alternately for the two threads or may use any technique to determine whether to fetch an instruction for the first thread (thread 0) or the second thread (thread 1). In various examples, the fetch stage 102 may comprise additional logic 103 which determines whether the processor is operating in a first mode (single threaded for 64-bit software) or a second mode (two-threaded for 32-bit software) and this may be determined based on the value of one or more configuration registers 105, where the configuration registers 105 indicate a width of software visible registers (e.g. a width of 32 bits for 32-bit software). In an example, there may be a single configuration bit which indicates whether the operating system is 64-bit or 32-bit and in an example, it may be set to '1' for 64-bit and '0' for 32-bit. Although the configuration registers 105 are shown separately from the RF 116 in FIG. 1, in other examples they may be part of the RF.

The additional logic 103 within the fetch stage 102 enables the fetch stage to handle instructions from two threads, particularly as PCs may be shared between threads (e.g. in a similar manner to the GPRs because the PCs are the same width as the GPRs, for example 31:0 for thread 0 and 63:32 for thread 1). This additional logic 103 selects which thread to fetch from (e.g. thread 0 or 1 for 64-bit hardware running in 32-bit mode).

Where virtualization is used and the root OS is a 64-bit OS, the configuration registers 105 are used only by hardware to identify whether the Guest context is 32-bit or 64-bit software. The configuration registers 105 may be set by the hypervisor (e.g. when it switches in the Guest OS's context). Where, however, the entire core is booted into either the first mode of operation (64-bit operation) or the second mode of operation (two-threaded 32-bit operation), the configuration registers may be set by something external to the CPU. In various examples, the configuration registers may be set on an external pin, which will not change unless the core is rebooted.

Once an instruction is fetched it is provided to the decode and rename stage 104 which is arranged to interpret the instructions and perform register renaming. In particular, each instruction may comprise a register write operation; one or more register read operations; and/or an arithmetic or logical operation. A register write operation writes to a destination register and a register read operation reads from a source register. During register renaming each architectural register referred to in an instruction (e.g. each source and destination register) is replaced (or renamed) with a physical register.

For register write operations the architectural register (e.g. destination register) referred to is allocated an unused (or available) physical register. Any allocation may be stored in a register renaming table, where the register renaming table is a data structure showing the mapping between each architectural register and the physical register allocated to that instruction in the program flow. For register read operations the correct physical register for a particular architectural register (e.g. source register) can be determined from an entry in the register renaming table indexed by the architectural register.

After an instruction passes through the decode and rename stage 104 it is inserted into a reorder buffer 106 (ROB) and dispatched to a functional unit 110 for execution. The functional unit 110 that the instruction is dispatched to may be based on the type of instruction. The re-order buffer 106 is a buffer that enables the instructions to be executed out-of-order, but committed in-order. The re-order buffer 106 holds the instructions that are inserted into it in program order, but the instructions within the ROB 106 can be executed out of sequence by the functional units 110. In some examples, the re-order buffer 106 can be formed as a circular buffer having a head pointing to the oldest instruction in the ROB 106, and a tail pointing to the youngest instruction in the ROB 106. Instructions are output from the re-order buffer 106 to the commit stage 108 in program order. In other words, an instruction is output from the head of the ROB 106 when that instruction has been executed, and the head is incremented to the next instruction in the ROB 106. Instructions output from the re-order buffer 106 are provided to a commit stage 108, which commits the results of the instructions to the register/memory.

Each functional unit 110 is responsible for executing instructions and may be configured to execute specific types of instructions. The functional units 110 may comprise one or more of a load-store unit, an integer unit, a floating point unit (FPU), a digital signal processing (DSP)/single instruction multiple data (SIMD) unit, or a multiply accumulate (MAC) unit. The load-store unit reads data to and writes data from the L1 cache and memory beyond that. In some instances, the load-store unit may calculate addresses and it may (or may not) contain the L1 cache and perform the data/tag RAM look-ups. The L1 cache may itself be split in a 'hard' or 'soft' manner between the threads when operating in a multi-threaded mode (but not when operating in normal mode with only a single thread running). In hard partitioning each cache is partitioned such that part of the physical cache is dedicated to each thread and the size of the partitions cannot be changed without flushing the cache, e.g. dividing the L1 cache based on indexes. In soft partitioning the cache is partitioned such that the size of partitions can be changed at run-time. In various examples the L1 cache may be split based on ways (for associative caches) using any suitable method and this may be considered hard or soft partitioning depending upon the method used. An integer unit performs integer instructions, an FPU executes floating point instructions, a DSP/SIMD unit has multiple processing elements that perform the same operation on multiple data points simultaneously, and a MAC unit computes the product of two numbers and adds that product to an accumulator. The pipelines within the functional units may have different lengths and/or complexities. For example, a FPU pipeline is typically longer than an integer execution pipeline because it is generally performing more complicated operations.

While executing the instructions received from the decode and rename stage 104, each functional unit 110 performs reads and writes to physical registers in one or more shared register files 116. When running 32-bit software on 64-bit hardware (the second mode of operation), the register file 116 (and in particular the GPRs within the RF), which in various examples may be arranged to store 32 64-bit addresses, is logically divided into two parts 120, 122. A first part RF-A 120 is used by the first thread (thread 0) and is 32×32 bits in size. The second part RF-B 122 is used by the second thread (thread 1) and is also 32×32 bits in size. In contrast, when running 64-bit software (the first mode of operation), the single thread reads the bottom 32 bits of the GPR from RF-A 120 and the top 32 bits of the GPR from RF-B 122, giving the appearance that there is a single register file 116 that contains the full 32×64 bits.

The splitting of the RF in this way may relate only to the GPRs within the RF. However, in various examples if there are other registers within the RF where the values to be stored are also smaller in a multi-threaded mode than the normal mode of operation, these may also be split between threads.

As shown in the lower part of FIG. 1, a functional unit 110 comprises logic 124, 126 (which may be referred to as 'decoder logic') that drives the registers (e.g. the flip-flops) and multiplexers within the RF 116. In the first mode of operation (e.g. when running 64 bit software), both of these elements 124 and 126 receive instructions and drive both portions of the RF 116 (i.e. RF-A 120 and RF-B 122) with the same information (e.g. both portions fetch GPRs 1 and 2 from each respective portion). As shown in FIG. 1, the results of the operations within the ALU 124 are also written back to the two portions of the RF 120, 122. The bottom 32 bits of the result are written back to RF-A 120, and the top 32 bits of the result are written back to RF-B 122. In the second mode of operation (e.g. when running 2 32-bit threads), the first of these logic elements 124 receives instructions relating to thread 0 and drives the first portion, RF-A 120, of the RF 116. Similarly, the second of these logic elements 126 receives instructions relating to thread 1 and drives the second portion, RF-B 122, of the RF 116. As shown in FIG. 1, the results of the operations within the ALU 124 are also written back to the two portions of the RF 120, 122. Results relating to the first thread are written back to the first portion, RF-A 120 and results relating to the second thread are written back to the second portion, RF-B 122.

By logically splitting the RF 116 in this way, the same RF can be used for either 64-bit or 32-bit operation. Additionally, when used with virtualization, the root OS (which is 64-bit software) sees the registers as 32 entries which are all 64-bit wide, irrespective of whether a guest OS is 64-bit or 32-bit and if required (e.g. upon a context switch) will save all the data in the RF 116 to memory without requiring any additional logic or changes to instructions.

Within a functional unit (e.g. within ALU 124), there may be parts of the logic that can be divided between the two threads, parts of the logic which may be duplicated and parts of the logic which may be shared between threads.

Figure 2:
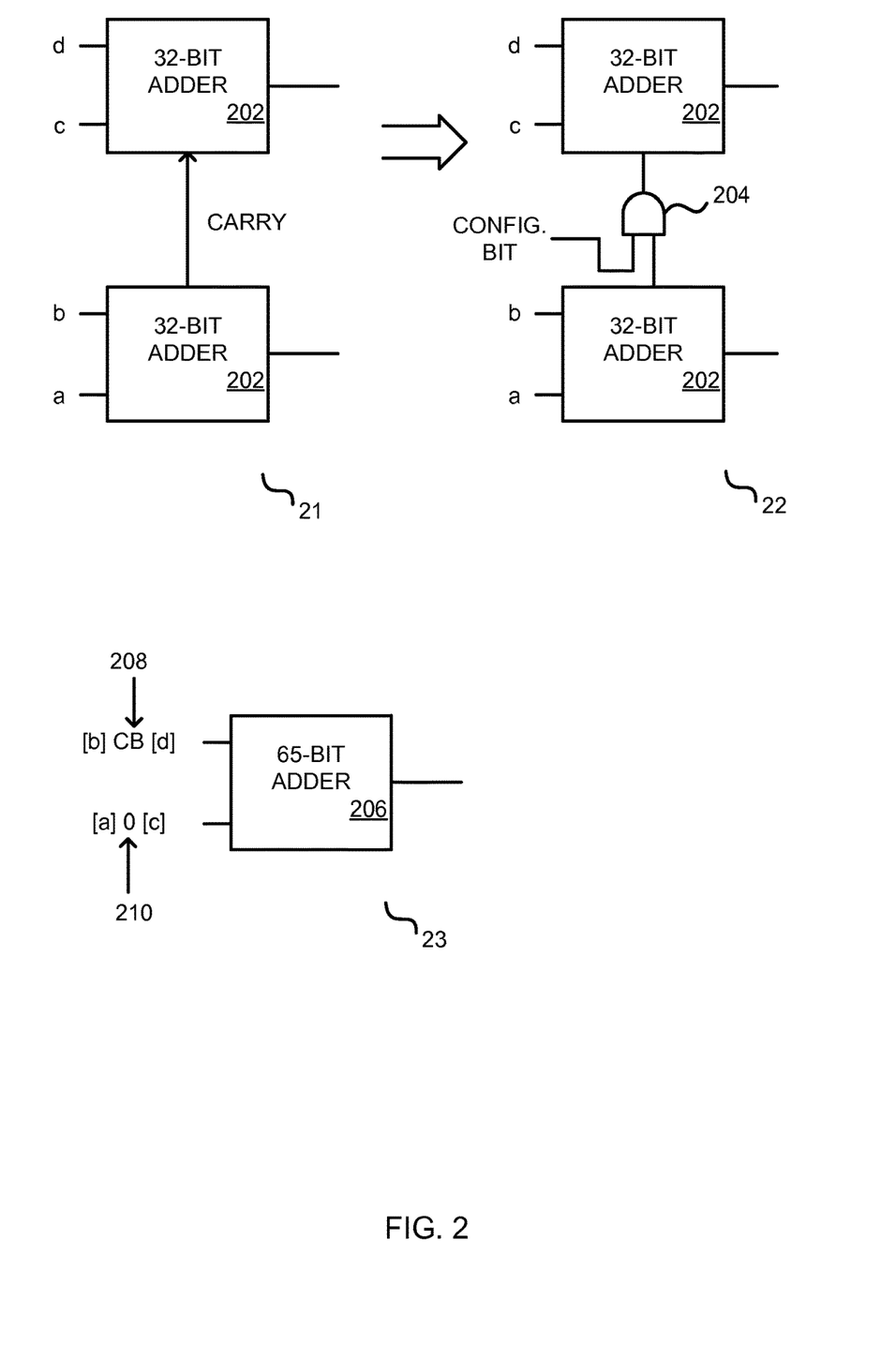
FIG. 2 shows three schematic diagrams of an adder function within an arithmetic logic unit (ALU)

FIG. 2 shows three schematic diagrams 21-23 of an adder function within an ALU. As shown in the first diagram 21, a 64-bit adder may be formed from two 32-bit adders 202 with a carry signal being passed from one 32-bit adder to the other. By adding logic into the carry path (e.g. an AND gate 204 as shown in the second diagram 22 in FIG. 2), a configuration bit (e.g. set to 1 for 64-bit software and 0 for 32-bit software) can be used to control whether the carry propagates from one 32-bit adder to the other (e.g. for 64-bit operation) or does not (e.g. for two-threaded 32-bit operation). The configuration bit may be stored in the configuration registers 105 shown in FIG. 1. When the configuration bit blocks the carry path, the two adders 202 operate independently. The first adder 202 can then be used for the first thread and the second adder 202 can be used for the second thread. Another implementation, as shown in the third diagram 23, may do a similar thing by having a 65 bit adder 206, where bit 32 (indicated by arrows 208 and 210) is tied to the configuration bit for one input operand, tied to 0 for the second input operand and is ignored on the output. In this example a configuration bit with a value of 1 would cause any overflow on the bottom 32 bit to propagate to the top 32 bits, without explicitly needing a carry-ripple style adder. A similar implementation to that shown in the diagrams 21-23 may be used for other mathematical functions within an ALU, such as a multiplier, where two blocks work together in the first mode (and may be linked in some way, e.g. in a similar fashion to integer SIMD multipliers) and the two blocks work independently in the second mode.

Figure 3:
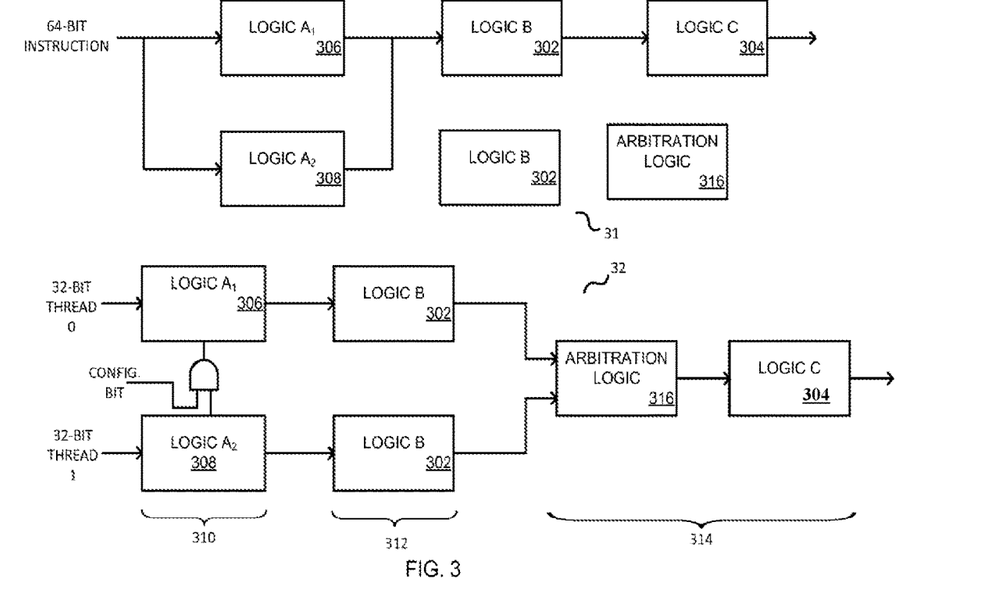
FIG. 3 shows two schematic diagrams of an example functional unit in both the first and second modes of operation.

FIG. 3 shows two schematic diagrams 31, 32 of an example functional unit in the first and second modes of operation. The functional unit comprises a logic function A, followed by a logic function B 302 and then a logic function C 304. In the first mode of operation (e.g. when running 64-bit software), logic function A is formed from two linked blocks $A_1$ 306, $A_2$ 308 in a similar manner to the adder shown in the first two diagrams in FIG. 2. In order to be able to also operate in the second mode of operation (two 32-bit threads), parts of the logic 310 are divided between the two threads (e.g. logic $A_1$ 306 and $A_2$ 308), parts of the logic 312 are duplicated (e.g. logic B 302) and parts of the logic 314 (e.g. logic C 304) are shared between threads, with logic 316 arbitrating between threads to determine which thread uses the logic at any time. In the first mode of operation (as shown in diagram 31), the duplicate logic B and arbitration logic 316 are not used. This is an example to show the different possible situations, other implementations may use combinations of divided/duplicated/shared logic resulting in more or less additional logic.

Whilst some logic functions such as an adder or a multiplier may be easily split between the two threads (e.g. as shown in FIGS. 2 and 3), there may be other logic functions, such as a divider, which cannot be easily split and such logic functions may either be replicated (as with logic B in FIG. 3) or shared between threads (as with logic C in FIG. 3). Similarly, if a functional unit (e.g. the FPU) has the same register width in both versions of software (e.g. a 32-bit version and a 64-bit version), then it cannot be split for multi-threaded operation. If a functional unit cannot be split, the threads may share the functional unit temporally (e.g. thread 0 uses it on one cycle, thread 1 uses it on the next cycle, thread 0 uses it on the next cycle, etc. as with the fetch stage 102).

The processor 100 may also comprise functional elements other than those shown in FIG. 1. For example, the processor may further comprise a branch predictor which is configured to predict which direction the program flow will take in the case of instructions known to cause possible flow changes, such as branch instructions. Branch prediction is useful as it enables instructions to be speculatively executed by the processor 100 before the outcome of the branch instruction is known. When the branch predictor predicts the program flow accurately, this improves performance of the processor 100. However, if the branch predictor does not correctly predict the branch direction, then a misprediction occurs which needs to be corrected before the program can continue. To correct a misprediction, the speculative instructions sent to the ROB 106 are abandoned, and the fetch stage 102 starts fetching instructions from the correct program branch.

It will be appreciated that other processors may not comprise all the functional elements shown in FIG. 1 (i.e. one or more of the functional elements shown in FIG. 1 may be omitted) and may, in some examples, comprise additional functional elements not shown in FIG. 1.

Figure 4:
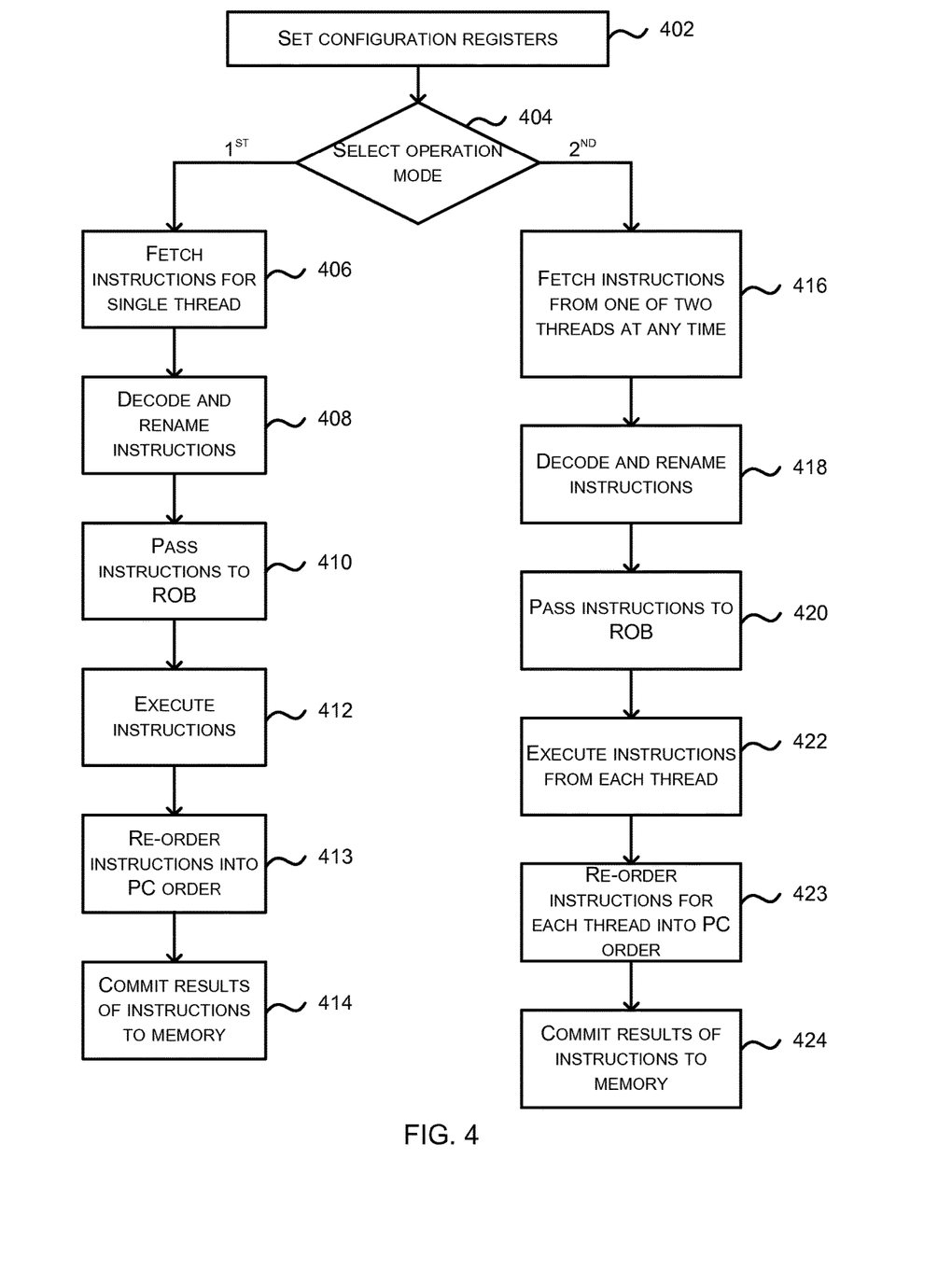
FIG. 4 is a flow diagram of an example method of operation of a processor, such as shown in FIG. 1.

FIG. 4 is a flow diagram of an example method of operation of a processor, such as shown in FIG. 1. As described above, configuration registers 105 are set (block 402) which determine the mode of operation of the processor (in block 404). In the first mode of operation, the processor operates as a single-threaded 64-bit device: fetching instructions (block 406), decoding and renaming those instructions (block 408), passing the instructions to the ROB (block 410), executing the instructions (block 412) and the re-ordering them into PC order (block 413) prior to committing the instructions (block 414). In the second mode of operation, the processor operates as a two-threaded 32-bit device and fetches instructions from both threads (block 416) e.g. instructions may be fetched alternately from thread 0 and thread 1. The fetched instructions are decoded and renamed (block 418) and passed to the ROB (block 420). As described above, the instructions are then executed (block 422) with instructions from the first thread reading from and writing to a first part of the register file and instructions from the second thread reading from and writing to a second part of the register file. As shown in FIG. 3 and described above, some aspects of the execution may be performed in parallel (e.g. such that a first instruction from thread 0 is executed at least partially in parallel with a second instruction from thread 1) and other aspects of the execution may be performed serially, with arbitrating logic determining which thread has priority at any time. Finally, the instructions from each thread are re-ordered into PC order (block 423) before the results of the instructions for the two threads are committed to memory (block 424).

In addition to splitting the RF 116 in the second mode of operation (as shown in FIG. 1), the ROB 106 may also be divided between the two threads (ROB-A 106A, ROB-B 106B) in the second mode of operation, as shown in FIG. 1. A commit unit 118 may also be modified to accommodate the two threads. The commit unit 118 is a unit which puts the instructions back in order, by reading from the ROB 106, following execution, and handles the commit stage 108 (e.g. in block 413). The modification to the commit unit 118 enables it to independently re-order the instructions from the two threads in the second mode of operation (e.g. in block 423).

The amount of duplication of logic within a processor which implements the methods described herein may be application specific. A larger amount of duplication will result in greater performance improvements (compared to 32-bit software running on standard 64-bit hardware) but increase the area of the device. In various examples, a processor may comprise duplicated logic for critical features within an ALU but other features may be shared.

As described above, the methods may be implemented in a processor which further comprises a branch predictor which is configured to predict which direction the program flow will take in the case of instructions known to cause possible flow changes, such as branch instructions. If the branch predictor does not correctly predict the branch direction, then a misprediction occurs which needs to be corrected before the program can continue. To correct a misprediction, the speculative instructions sent to the ROB 106 are abandoned, and the fetch stage 102 starts fetching instructions from the correct program branch. When operating in the second mode of operation (e.g. running 32-bit software), a misprediction in either thread (e.g. thread 0 or thread 1) may result in flushing the mispredicted instruction and all subsequent instructions from both threads from the functional units 110. In such an example, the fetch unit 102 then starts fetching instructions again for both threads. Alternatively, however, the logic which is used to flush the functional units in the event of a mis-speculation by the processor may be modified/duplicated such that a mis-speculation in one of the 32-bit threads (e.g. thread 0) only results in the flushing of instructions from that thread and does not require flushing of any instructions from the other thread (e.g. thread 1). The logic which is used to flush the functional units is spread throughout the functional unit, for examples at register stages within a functional unit (e.g. to implement "if (flush)registers.valid=0"). Additional logic may be added to selectively flush the pipeline which performs an extra comparison (against the thread number) to check whether it needs to flush the stage or not (e.g. "if (flush and flush.thread==registers.thread) registers.valid=0").

The methods described herein may be used in combination with virtualization. In such an example, the hypervisor/root OS is 64-bit software and the guest OS may be 32-bit or 64-bit.

As described above, the processor may switch dynamically between modes of operation. Where virtualization is used, the switching may occur when different guest OSs are booted and where virtualization is not used, the switching occurs on booting the processor. The setting of the configuration bit(s) which control which mode of operation the processor operates in may be done in hardware or software.

Although the description above refers to an out-of-order processor, the methods may also be used in an in-order processor 500 as shown in FIG. 5. The in-order processor comprises a fetch stage 102, decode stage 504, one or more functional units 110 and register file 116. It will be appreciated that other in-order processors may not comprise all the functional elements shown in FIG. 5 (i.e. one or more of the functional elements shown in FIG. 5 may be omitted) and may, in some examples, comprise additional functional elements not shown in FIG. 5. Where the methods are implemented in an in-order processor 500, there may be some additional changes which are not used in an out-of-order processor. For example, additional logic may be provided (in the fetch or decode stages 102, 504) to flush a blocked thread (when operating in a multi-threaded mode) so that the other thread can get through to the functional (or execution) units 110.

Although many of the examples described above refer to running an OS with a reduced width of software visible registers (e.g. a 32-bit OS) on hardware which provides wider registers (e.g. 64-bit registers as provided by 64-bit hardware), it will be appreciated that operating systems are just one example of the type of software for which the methods described herein may be used (e.g. the methods may be used where the software is firmware instead of a full OS).

Although the processors 100, 500 described comprise RFs which are shared between threads in a multi-threaded mode of operation, in various examples, a processor may comprise additional stages and/or buffers which are shared between threads in the multi-threaded mode of operation.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein. For example, a non-transitory computer readable storage medium may have stored thereon computer readable instructions that, when processed at a computer system for generating a manifestation of an integrated circuit, cause the computer system to generate a manifestation of a processor of a receiver as described in the examples herein or to generate a manifestation of a processor configured to perform a method as described in the examples herein. The manifestation of a processor could be the processor itself, or a representation of the processor (e.g. a mask) which can be used to generate the processor.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A processor arranged to run software and having a first mode of operation in which the processor operates as a single-threaded (nX)-bit processor and a second mode of operation in which the processor operates as an n-threaded X-bit processor, where n and X are positive integers greater than one and nX is n multiplied by X, the processor comprising:
   one or more configuration registers arranged to store a single configuration parameter, the configuration parameter indicating a width of software visible registers;
   a fetch stage arranged in the first mode of operation to fetch instructions from a single thread of the software and in the second mode of operation to fetch instructions from each of n threads of the software and to switch between the first and second modes of operation dependent upon a value of the configuration parameter;
   a register file comprising a plurality of general purpose registers;
   control logic associated with the register file and arranged, in the second mode of operation, to logically divide the register file into n portions and to control access to the portions, each portion being arranged to store data for one of the n threads of the software and arranged to switch between the first and second modes of operation dependent upon the value of the configuration parameter; and
   one or more execution units arranged to execute instructions from the single thread in the first mode of operation and to execute instructions from the n threads in the second mode of operation and-to switch between the first and second modes of operation dependent upon the value of the configuration parameter.

2. A processor according to claim 1, wherein the processor is a 64-bit processor, n=2 and X=32, the configuration parameter is arranged to indicate whether the software is a 64-bit operating system or a 32-bit operating system, and the fetch stage, the control logic and the one or more execution units are each arranged to operate in the first mode in response to the configuration parameter indicating that the software is a 64-bit operating system and to operate in the second mode in response to the configuration parameter indicating that the software is a 32-bit operating system.

3. A processor according to claim 1, wherein n=2.

4. A processor according to claim 3, wherein at least one execution unit comprises a logic function formed from two linked logic blocks wherein in the second mode of operation, links between the two logic blocks are blocked and each logic block executes instructions from one of the two threads and wherein a connection between the two linked logic blocks is controlled based on a value of the configuration parameter.

5. A processor according to claim 1, wherein at least one execution unit comprises a logic function comprising a plurality of replicated blocks each arranged to execute instructions from a different thread.

6. A processor according to claim 1, wherein at least one execution unit comprises a logic function comprising a logic block and arbitration logic arranged to share the logic block between threads in the second mode of operation.

7. A processor according to claim 1, wherein the processor is an out-of-order processor and the processor further comprises:
a re-order buffer; and
a commit unit,
wherein in the second mode of operation the re-order buffer is logically divided into n parts, each part being associated with one of the n threads, and
wherein the commit unit is arranged to re-order instructions for the single thread in the first mode of operation and to re-order instructions for each of the n threads in the second mode of operation by reading from the re-order buffer.

8. A processor according to claim 7, wherein an execution unit comprises flushing logic arranged to perform a comparison against thread number prior to flushing a part of that execution unit.

9. A processor according to claim 1, wherein the software comprises a guest system running on a virtual machine on the processor.

10. A method of operating a processor, wherein the processor is arranged to run software and the method comprising:
setting one or more configuration registers to indicate a width of software visible registers;
switching between a first and a second mode of operation based on the one or more configuration registers, wherein in the first mode the processor operates as a single-threaded (nX)-bit processor and in the second mode the processor operates as an n-threaded X-bit processor, where n and X are positive integers greater than one and nX is n multiplied by X;
in the second mode of operation, logically dividing a register file in the processor into n portions, each portion being arranged to store data for one of n threads of the software, wherein the register file comprises a plurality of general purpose registers;
in the first mode of operation, fetching and executing instructions from a single thread of the software; and
in the second mode of operation, fetching and executing instructions from the n threads of the software.

11. A method according to claim 10, wherein the processor is a 64-bit processor, n=2 and X=32 and the one or more configuration registers indicate whether the software is a 64-bit operating system or a 32-bit operating system.

12. A method according to claim 10, wherein n=2.

13. A method according to claim 12, wherein the processor comprises an execution unit comprising a logic function formed from two linked logic blocks, and the method further comprises, in the second mode of operation, blocking links between the two linked logic blocks and executing instructions for each thread independently in separate logic blocks from the two linked logic blocks.

14. A method according to claim 10, wherein the processor comprises an execution unit comprising a logic function and the method further comprises executing instructions sequentially for each of the n threads in the logic function.

15. A method according to claim 10, wherein the processor is an out-of-order processor and the method further comprises:
in the first mode of operation, re-ordering instructions for the single thread prior to committing the instructions for the single thread; and
in the second mode of operation, re-ordering instructions for each of the n threads prior to committing the instructions for each of the n threads.

16. A method according to claim 15, further comprising:
performing a comparison prior to flushing a part of an execution unit, the comparison being based on thread number.

17. A method according to claim 10, wherein the software comprises a guest system running on a virtual machine on the processor.

18. A non-transitory computer readable storage medium having stored thereon computer readable instructions that, when processed at a computer system for generating a manifestation of an integrated circuit, cause the computer system to generate a manifestation of a processor arranged to run software and having a first mode of operation in which the processor operates as a single-threaded (nX)-bit processor and a second mode of operation in which the processor operates as an n-threaded X-bit processor, where n and X are positive integers greater than one and nX is n multiplied by X, the processor comprising:
one or more configuration registers arranged to store a single configuration parameter, the configuration parameter indicating a width of software visible registers;
a fetch stage arranged in the first mode of operation to fetch instructions from a single thread of the software and in the second mode of operation to fetch instructions from each of n threads of the software and to switch between the first and second modes of operation dependent upon a value of the configuration parameter;
a register file comprising a plurality of general purpose registers;
control logic associated with the register file and arranged, in the second mode of operation, to logically divide the register file into n portions and to control access to the portions, each portion being arranged to store data for one of the n threads of the software and arranged to switch between the first and second modes of operation dependent upon a value of the configuration parameter; and
one or more execution units arranged to execute instructions from the single thread in the first mode of operation and to execute instructions from the n threads in the second mode of operation and to switch between the first and second modes of operation dependent upon the value of the configuration parameter.

* * * * *